Patented Dec. 5, 1922.

1,437,740

UNITED STATES PATENT OFFICE.

ARNO WEIDEL, OF CHARLOTTENBURG-WESTEND, GERMANY, ASSIGNOR TO THE FIRM: CHEMISCHE FABRIK AUF ACTIEN (VORMALS E. SCHERING), OF BERLIN, GERMANY.

PRODUCTION OF ALKALI-METAL BROMIDES.

No Drawing.    Application filed May 15, 1922. Serial No. 561,035.

*To all whom it may concern:*

Be it known that I, ARNO WEIDEL, a citizen of Germany, residing at Charlottenburg-Westend, Germany, have invented certain new and useful Improvements in the Production of Alkali-Metal Bromides (for which I have filed an application in Germany May 11, 1921), of which the following is a specification.

My invention refers to the production of alkali-metal bromides and its particular object is to produce alkali bromides free of bromates in a simpler and a more efficient manner than was hitherto possible.

The oldest method followed in making bromine salts was based upon the action of liquid bromine on caustic alkalis or alkali-metal carbonates. Thus according to the equation $$6NaOH + 6Br = 5NaBr + NaBrO_3 + 3H_2O$$

besides sodium bromide there is also formed as a by-product bromate of sodium which must be separated out by different operations in order to obtain pure bromine salts.

According to a more recent method alkali-metal bromide solutions are obtained in a single operation by reacting on iron bromide with potash or the like. However in this case as well the oxidizing capacity of bromine is not utilized. The same applies to the method employed by Meschorer who reduces the bromate formed in statu nascendi by means of alkali-metal thiosulfate (see Wilhelm Hüttner "Die Fabrikation der Bromsalze" 1918).

According to the present invention, now, the oxidizing capacity of the bromine is utilized and the production of iron bromide is avoided, alkali-metal bromide solutions, free of bromate, being obtained by causing liquid bromine to act on an alkali-metal compound such as an alkali-metal hydroxide or alkali-metal carbonate in the presence of a manganous compound such as manganous carbonate or manganous hydrate. There results at the same time from the manganous carbonate or manganous hydroxide, which is available as a waste product from manganese liquors, a high-grade artificial pyrolusite.

The reaction is illustrated for instance by the following equation $$Na_2CO_3 + MnCO_3 + Br_2 = 2NaBr + MnO_2 + 2CO_2.$$

*Example I.*—Into a boiling watery, well stirred suspension of 115 parts by weight of rinsed manganous carbonate there are gradually introduced 286 parts by weight of pure crystallized soda, bromine being at the same time allowed to enter through a tube hanging down to the bottom of the reaction vessel. Provided that the liquid is well stirred, the bromine can be added rather quickly without any bromine vapors escaping from the liquid. After the required quantity of bromine (160 parts of weight) has been added, boiling is continued as long as carbonic acid escapes. The manganese dioxide hydrate obtained which settles down speedily, can easily be separated from the clear bromide liquor by aid of suction filters or filter presses and forms a high-grade oxidizing agent. The filtrate is worked up in the usual manner with a view to obtaining sodium bromide. The washwater is used for another operation.

*Example II.*—115 parts by weight of manganous carbonate and 124 parts by weight of caustic potash of 90% are stirred with pure water into a thin pulp and heated to boiling point. To this mixture 160 parts by weight of bromine are added in the manner described with reference to Example I. The manganous carbonate, which may as well be replaced by the corresponding quantity of manganous hydroxide, is regenerated quantitatively in the form of $MnO_2.H_2O$ as in Example I, while from the filtrate pure potassium bromide can be obtained in the usual manner and with almost quantitative yield.

I wish it to be understood that I do not desire to be limited to the exact sequence of steps nor to the proportions described, for obvious modifications will occur to a person skilled in the art.

I claim:

1. The method of producing pure alkali-metal bromide which consists in causing liquid bromine to act upon an alkali-metal compound decomposable by bromine in the presence of a manganous compound decomposable by bromine.

2. The method of producing pure alkali-metal bromide which consists in causing liquid bromine to act upon alkali-metal carbonate in the presence of a manganous compound decomposable by bromine.

3. The method of producing pure alkali-metal bromide which consists in causing liquid bromine to act upon an alkali-metal compound decomposable by bromine in the presence of manganous carbonate.

4. The method of producing pure alkali-metal bromide which consists in causing liquid bromine to act upon alkali-metal carbonate in the presence of manganous carbonate.

5. The method of producing pure alkali-metal bromide which consists in causing one molecule of liquid bromine to act upon one molecule of an alkali-metal compound decomposable by bromine in the presence of a manganous compound decomposable by bromine.

6. The method of producing pure alkali-metal bromide which consists in introducing liquid bromine into a boiling suspension of a manganous compound decomposable by bromine in a boiling solution of an alkali-metal compound, separating the manganese dioxide obtained from the solution and subjecting this latter to treatment adapted to yield pure alkali-metal bromide.

7. The method of producing pure alkali-metal bromide which consists in causing 160 parts by weight of liquid bromine to act upon a boiling watery solution of 286 parts of weight of crystallized soda, in which 115 parts of manganous carbonate are suspended, and separating the liquor from the manganese dioxide which has settled down.

In testimony whereof I affix my signature.

ARNO WEIDEL.